US009940186B2

(12) United States Patent
Fader et al.

(10) Patent No.: US 9,940,186 B2
(45) Date of Patent: Apr. 10, 2018

(54) MEMORY CONTROLLER AND METHOD OF OPERATING A MEMORY CONTROLLER

(71) Applicant: Freescale Semiconductor, Inc., Austin, TX (US)

(72) Inventors: Joachim Fader, Munich (DE); Ray Charles Marshall, Harpenden (GB); Dirk Wendel, Grasbrunn (DE)

(73) Assignee: NXP USA, Inc., Austin, TX (US)

( * ) Notice: Subject to any disclaimer, the term of this patent is extended or adjusted under 35 U.S.C. 154(b) by 0 days.

(21) Appl. No.: 14/978,065

(22) Filed: Dec. 22, 2015

(65) Prior Publication Data
US 2017/0177432 A1 Jun. 22, 2017

(51) Int. Cl.
*G11C 29/00* (2006.01)
*G06F 11/07* (2006.01)
*G06F 11/10* (2006.01)

(52) U.S. Cl.
CPC ........ *G06F 11/0787* (2013.01); *G06F 11/102* (2013.01); *G06F 11/1004* (2013.01); *G06F 11/1064* (2013.01)

(58) Field of Classification Search
None
See application file for complete search history.

(56) References Cited

U.S. PATENT DOCUMENTS

| 7,719,890 B2* | 5/2010 | Gorobets | G06F 11/1441 365/185.04 |
|---|---|---|---|
| 7,739,576 B2* | 6/2010 | Radke | G06F 11/1068 711/103 |
| 8,650,461 B2* | 2/2014 | Shalvi | G06F 11/10 365/185.09 |
| 8,806,293 B2* | 8/2014 | Tiziani | G06F 11/10 365/185.09 |
| 2015/0301890 A1 | 10/2015 | Marshall et al. | |
| 2016/0139837 A1* | 5/2016 | Welker | G06F 3/0659 714/6.11 |

OTHER PUBLICATIONS

Aniruddha N. Udipi et al.: "LOT-ECC: Localized and Tiered Reliability Mechanisms for Commodity Memory Systems", Computer Architecture (ISCA), 2012 39th Annual International Symposium on, Jun. 9-13, 2012, pp. 285-296.

(Continued)

*Primary Examiner* — Daniel McMahon

(57) ABSTRACT

A memory controller includes a transaction interface arranged to be coupled to a transaction interconnect to receive a write transaction comprising write data, a mode controller arranged to obtain context information and to select a data protection scheme out of a plurality of data protection schemes based on the obtained context information, at least one data protection module to apply the selected data protection scheme by generating one or more protection code sequences from at least the write data in accordance with the selected data protection scheme, and a physical memory interface coupled to at least one memory device to store the write data and the one or more protection code sequences in the at least one memory device.

17 Claims, 7 Drawing Sheets

(56) References Cited

OTHER PUBLICATIONS

Gabriel H. Loh et al.: "Efficiently enabling conventional block sizes for very large die-stacked DRAM caches", Proceedings of the 44th Annual IEEE/ACM International Symposium on Microarchitecture, 2011, pp. 454-464.

Doe Hyun Yoon et al.: "Virtualized ECC: Flexible Reliability in Main Memory", Micro, IEEE, vol. 31, Issue: 1, Dec. 10, 2010, pp. 11-19.

Manu Awasthi et al.: "Efficient scrub mechanisms for error-prone emerging memories", HPCA '12 Proceedings of the 2012 IEEE 18th International Symposium on High-Performance Computer Architecture, pp. 1-12.

Altera: "DDR and DDR2 SDRAM ECC Reference Design", Application Note 415, Version 1.0, Jun. 2006, AN-415-1.0.

* cited by examiner

MEMORY CONTROLLER AND METHOD OF OPERATING A MEMORY CONTROLLER

FIELD OF THE INVENTION

The present disclosure relates generally to an apparatus for transfer of data elements between a bus master and a memory controller for a memory storage device. It also relates to a data storage interface device for transfer of data elements between a bus master and a memory controller for a memory storage device.

BACKGROUND

The integrity of information stored in computer memory cannot be guaranteed. Bits stored for instance in computer memory such as dynamic random access memory (DRAM) are susceptible to fault events due to unintended change of electric values and/or characteristics representing the stored bits. Such unintended value change may be categorized into "hard" errors, which are permanent errors, in particular errors caused by hardware defects, or "soft" errors, which are non-permanent errors, in particular errors caused by electromagnetic and/or particle radiation, such as cosmic radiation or radiation from decay of radioactive material. Soft errors are unpredictable and occur in memory at random locations and times, although at an average rate, which can be empirically determined.

A scheme for detecting and correcting errors in computer memory involves storing, in addition to the data to be protected against errors, an error correction code ("ECC") in association with the data. A number of algorithms are available for generating error correction codes, which permit the detection or correction of one or more bit errors in the bit sequence of data.

In general, an error correction ("EC") scheme can be devised to detect or correct a one-bit error in each EC cycle using an ECC with a given bit length. In order to detect or correct two or more errors per EC cycle, an ECC with a larger number of bits is needs. For instance, so-called Hamming codes are used, which provide single bit error correction and double bit error detection (SEC-DED).

Today's dynamic random access memory (DRAM) technology is largely dominated by the JEDEC memory standards for computer memory (RAM) of the JEDEC Solid State Technology Association. In particular, the JEDEC memory standards include the Double data rate synchronous dynamic random-access memory (DDR SDRAM) standard, the latest version of which is version 4 generally denoted as DDR4.

The JEDEC's DDR standards include specifications of ECC blocks, which comprise encoder/decoder-correlators to detect and correct single-bit errors and to detect double-bit errors (e.g. using 8-bit ECC for each 64-bit data). The ECC block of the JEDEC's DDR standards address primarily the fields of servers such as file server, multi-user application server, scientific and financial application servers etc. The implementation of ECC DDR RAM modules requires additional wiring for the 8-bit ECC, which is economically unacceptable in embedded cost sensitive applications, and further raises the power requirement, which is also unacceptable in embedded low-power applications. Moreover, it should be noted that the ECC blocks specified according to the JEDEC's DDR standards do not meet the requirements of functional safety (e.g. as per ISO 26262) required for embedded applications in safety critical application use cases.

The low power implementations of the JEDEC DDR standards in turn address primarily mobile consumer devices such as mobile phones, tablets, notebooks and the like. The low power implementations of the JEDEC DDR standards lack a specifications of ECC blocks since the addressed fields of usage lack the error correction requirement. However, an increasing number of embedded applications make use of such low power implementations, e.g. according to JEDEC's LPDDR specifications, for meeting power constraints. In particular, embedded applications in the field of transportation have to meet the requirements of safety critical systems (e.g. as per ISO 26262).

Hence, there is a need to provide an economic and bandwidth efficient error detection and/or error correction scheme for memory controllers with selective data protections schemes adapted to different constraints and requirements supporting e.g. non-ECC random access memory (RAM), in particular low power non-ECC random access memory (RAM).

SUMMARY

The present invention provides a memory controller, a method of operating a memory controller and a non-transitory, tangible computer readable storage medium bearing computer executable instructions for operating the memory controller as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Figure 1:
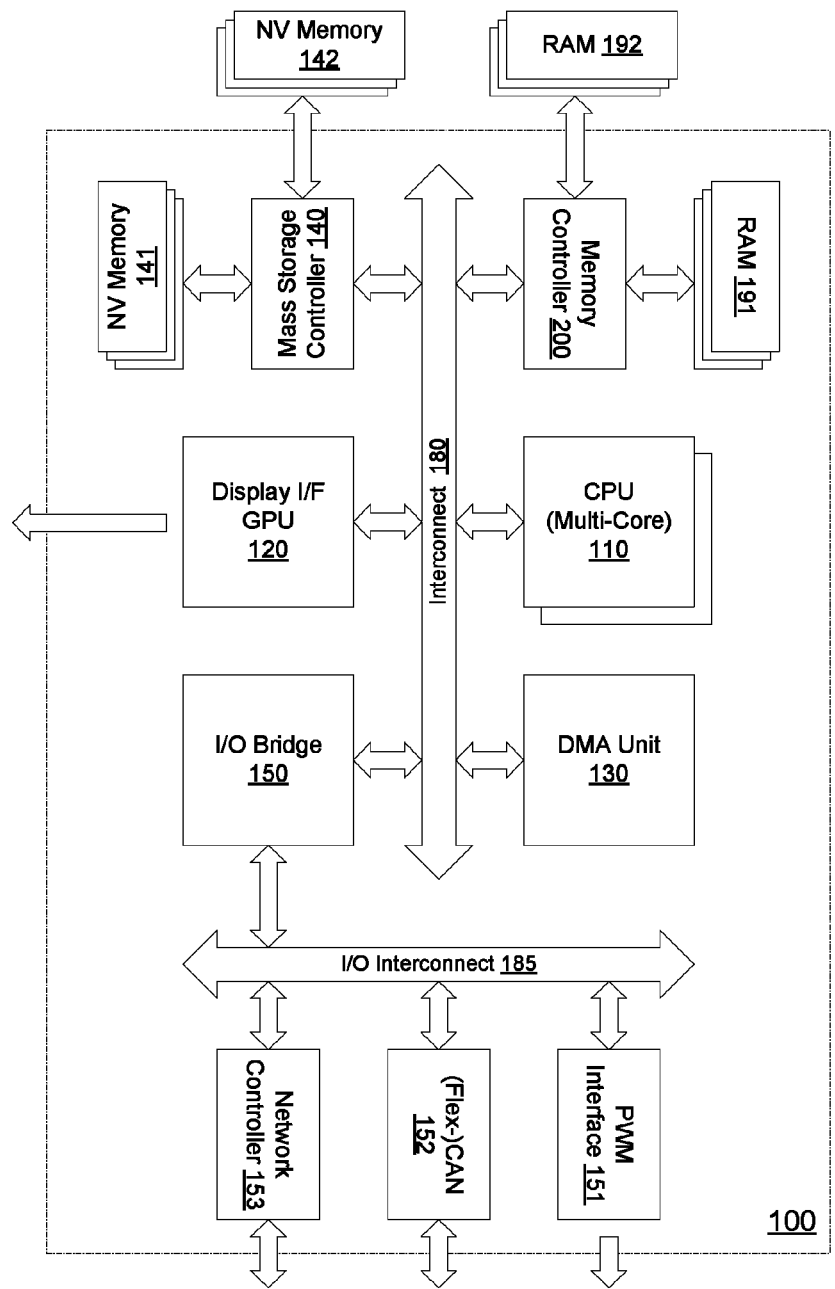
FIG. 1 schematically illustrates a block diagram of a computing system according to an example of the present invention.

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Referring now to FIG. 1, a schematic block diagram of an illustrative computing system 100, in particular a SoC (system-on-chip), a SIP (system-in-package) or a SoP (system-on-package) according to an example of the present application is shown. The computing system 100 comprises a processing unit (CPU) 110, which communicates data via one or more interconnects 180, 185 with further functional units of the computing system 100. Data communications should be understood to comprise read or write transactions allowing for transferring data between the functional units. It should be noted that the processing unit (CPU) 110 may be considered as one of the functional units of the computing system 100.

The processing unit (CPU) 110 may be a general purpose processor, the processing unit (CPU) 110 may have a single or multiple core design. The processing unit (CPU) 110 with a multiple core design may integrate different types of processor cores implemented as symmetrical or asymmetrical multiprocessor.

The interconnects 180, 185 may comprise one or more shared interconnecting buses for connecting multiple functional units of the computing system 100 to enable data communications between them. The multiple functional units connected to a bus listen to signals asserted on the bus. Only one of the connected functional units is allowed to assert signals on the bus at any given time. Signals asserted on the bus are conveyed to all connected functional units. One or more of the connected functional units may have so-called bus mastering functionality allowing for asserting signals on the bus. An arbitration scheme controls the grant of the connected functional units with bus mastering functionality to assert signals on the bus in order to avoid conflicting signal assertions on the bus. The arbitration scheme ensures that only one connected functional units with bus mastering functionality is allowed to assert signals at any given time.

The interconnects 180, 185 may further comprise switch fabrics or crossbar switches for connecting multiple functional units of the computing system 100 to enable non-blocking many-to-many data communications mechanisms for two-way data communications between them. The switch fabrics or crossbar switches support multiple simultaneous data communications between connected functional units.

The computing system 100 further comprises a memory controller 200, which is coupled to the interconnect 180 and arranged for enabling data read and/or write access from one or more functional units of the computing system 100 to one or more memory devices 191, 192 coupled to the memory controller 200. The one or more memory devices 191, 192 may be detachable coupled to the memory controller 200.

The one or more memory devices 191, 192 may be arranged internally and/or externally to the computer system 100.

The memory devices 191, 192 are provided to store data, including sequences of instructions, which may be executed by the processing unit (CPU) 110 or any other functional unit of the computing system 100. In an example of the present application, the memory devices 191, 192 may be volatile memory devices 191, 192 including for instance random access memories (RAM), dynamic RAM (DRAM), synchronous DRAM (SDRAM), static RAM (SRAM), or other types of random access memory devices. In an example of the present application, the memory devices 191, 192 are non-ECC memory devices and in particular non-ECC DDR DRAM (double data rate dynamic random access memory) devices.

The computing system 100 further comprises a mass storage controller 140, which is coupled to the interconnect 180 and arranged for enabling read and/or write access by one or more functional units of the computing system 100 to one or more mass storage devices 141, 142 coupled to the mass storage controller 140.

The mass storage devices 141, 142 are provided to store data, including sequences of instructions. The one or more mass storage memory devices 141, 142 may be detachable coupled to the mass storage controller 140. The one or more mass storage devices 141, 142 may be arranged internally and/or externally to the computer system 100. In one example of the present application, the mass storage devices 141, 142 may be non-volatile memory device including for instance read-only memory (ROM), electrically erasable programmable read-only memory (EEPROM), flash memory, magnetic computer storage devices such as hard disk drives, floppy disks, and magnetic tape, optical computer storage devices such as a compact disk (CD), and a digital versatile disc (DVD), a magneto-optical (MO) disk, or other types of non-volatile machine-readable media.

The computing system 100 may further comprise a display graphics interface 120 that communicates with a display device (not shown). The display graphics interface 120 is coupled to the interconnect 180 to receive display related data from one or more functional units of the computing system 100. The display graphics interface 120 may comprise a graphics processing unit (GPU).

The communication of data between one or more functional units of the computing system 100 and the volatile memory devices 191, 192 may be facilitated by a direct memory access (DMA) unit 130, which facilitates data access by one or more functional units to the memory devices 191, 192 without use of the processing unit (CPU) 110 of the computing system 100.

The computing system 100 may further comprise one or more I/O units or I/O peripherals 151 to 153 enabling data communications with I/O devices (not shown) external to the computing system 100. The I/O units 151 to 153 may be coupled to an I/O interconnect 185, which may be coupled via an I/O bridge 150 to the interconnect 180 of the computing system. The I/O bridge 150 provides a data path between the processing unit (CPU) 110 and I/O units 151 to 153. It should be noted that other types of topologies may be utilized. Also, multiple I/O interconnects may communicate with the interconnect 180, e.g., through multiple bridges 150. The one or more I/O units 151 to 153 may include, in various examples of the present application, a network controller 153, a Controller Area Network (CAN) interface 152, a pulse-width modulation (PWM) signal interface 151, USB interface, any parallel and/or serial interfaces, and the like.

Figure 2:
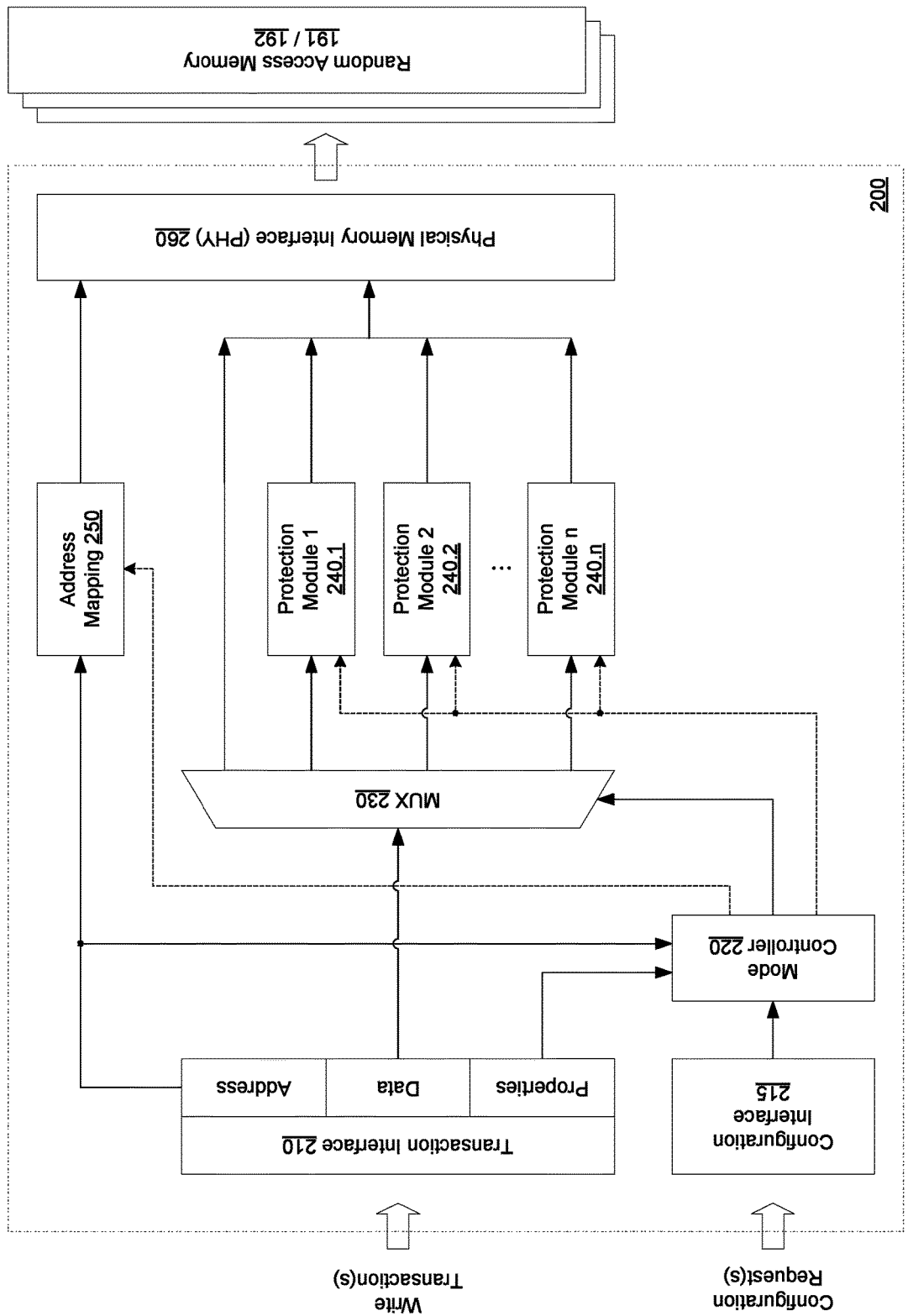
FIG. 2 schematically illustrates a block diagram of a memory controller supporting several data protection schemes according to an example of the present invention.

Referring now to FIG. 2, a schematic block diagram of a memory controller according to an embodiment of the present application is illustratively shown. The memory controller shown in FIG. 2 may be a memory controller 200, which interfaces between the interconnect 180 of the computing system 100 and the one or more memory devices 191, 192, in particular one or more random access memory (RAM) devices. Nevertheless, the memory controller of FIG. 2 should be understood to represent a general memory controller capable of interfacing between any interconnect and at least one memory device provided to store any data including instructions, in particular capable of interfacing between an interconnect of a computer system and at least one memory device.

A memory operation is an operation causing transaction of data from a source to a destination. The source and destination may be storage locations within the computing system or may be storage locations within the memory. When a source or destination is a storage location within memory, the source or destination is specified via an address conveyed with the memory operation. Memory operations may be read or write operations (or load and store operations). A read operation causes transfer of data from a source outside of the initiator/requestor (of the read operation) to a destination within the initiator/requestor. A write operation causes a transfer of data from a source within the initiator/requestor (of the write operation) to a destination outside the initiator/requestor. In the computing system 100, a memory operation may include one or more transactions on the interconnect between a functional unit being an initiator/requestor and the memory controller 200 interfacing to the one or more memory devices 191, 192.

The memory controller 200 is arranged to apply different protection schemes. Each protection scheme is applicable on write data of a write transaction received via a transaction interface 210 arranged to interfaces read or write data transactions on an interconnect of a computer system with the memory controller 200.

A specific number of data check bits, a so-called protection code sequence, is generated based on the write data of a write transaction received by the memory controller 200 in accordance with one of the data protection schemes supported by the memory controller 200. The protection code sequence and the write data is then written to the at least one memory device 191, 192. During subsequent read-write cycles or other memory accesses, the protection code sequence is used to verify the correct values for the data. In general, the number of data check bits of a protection code sequence required to implement the data protection function depends among others on the number of data bits to be protected and the level of protection (e.g. relating to the number of erroneous bits, which are detectable, and/or the number of erroneous bits, which are correctible).

According to an example of the present application, the different data protection schemes comprises:

Different protection levels (or protection strengths) relating to the capability to detect a predefined number of bit errors and to correct a predefined number of bit errors. A protection code sequence may be generated to allow for detecting single error detection (SED), single error correction (SEC), single error correction plus double error detection (SEC-DED), double error correction (DEC), double error correction plus triple error detection (DEC-TED), etc. The protection code sequence may be partitioned into a detection code sequences allowing for detecting bit errors and a correction code sequence allowing for correcting bit errors. In an example of the present application, a lowest protection level indicates to omit generating a protection code sequence.

Different protection (block) sizes (or protection granularities) relating to the length of the bit sequences (block size) individually protected by a code sequence (the granularity of the data protection scheme). The write data of a write transaction may be partitioned accordingly. A block size may for instance comprise an 8-bit, 16-bit, 32-bit, 64-bit, 128-bit, and 256-bit sequence. An individual protection code sequence is determined for each block.

Different protection scopes (or protection coverage) relating to the data to be protected, which comprise at least a part of the payload (write) data of a write transactions and one or more transaction related parameters. The transaction related parameters comprise for instance the address information to be covered by the scope of protection. The data to be protected may be a bit sequence obtained by concatenating at least a part of the write data and the address associated with the write transaction.

Different protection code write strategies relating to write strategy of the protection code sequence and the write data to the at least one volatile memory device 191, 192 by the physical memory interface 260. The protection code sequence may be appended to at least a part of the write data and written in one cycle into the at least one volatile memory device 191, 192. The write data and the one or more protection code sequences may be written in two or more cycles into the at least one volatile memory device 191, 192. The write data may be written into the at least one volatile memory device 191, 192 and the writing of the one or more protection code sequences into the at least one volatile memory device 191, 192 may be deferred using a cache for temporarily caching the protection code sequences. The caching of individual protection code sequences may be applied to burst write transactions.

For the sake of illustration, the memory controller 200 is shown to comprise different data protection modules 240.1 to 240.n, each of which should be understood to represent illustratively one out of a set of different data protection schemes applicable by the memory controller 200 to protect data stored in the at least one memory device 191, 192. The different data protection schemes may be implemented on the basis of one or more separate electric circuitries or configurable/programmable modules.

For the sake of explanation only, each of the data protection modules 240.1 to 240.n should be understood to be configured for applying a predefined data protection scheme on data received via the interconnect to be written to a memory device 191, 192. The data protection scheme to be applied, i.e. the data protection module 240.x to be used, is controlled by a mode controller 220. In accordance with a data protection scheme selected by the mode controller 220, write data of a write transaction received via the transaction interface 210 is passed to the respective one of the data protection modules 240.1 to 240.n; the selected respective one of the data protection modules 240.1 to 240.n implements the selected data protection scheme. The routing of the received write data under control of the mode controller 220 is schematically illustrated by a 1×n multiplexer MUX 230, which is controlled by a selection control signal provide by the mode controller 220. The 1×n multiplexer MUX 230 is further controllable by the mode controller 220 to route the received write data directly to the physical memory interface (PHY) 260 bypassing the data protection modules 240.1 to 240.*n*. In the latter case, a protection code sequence is not generated for the write data, which is stored unprotected in the at least one memory device 191, 192.

During a write cycle, the data protection module 240.*y*, which is selected by the mode controller 220 for applying the predefined data protection scheme, is arranged to generate a protection code sequence (a number of data check bits) based on the data protection scheme implemented by the selected data protection module 240.*y* and to write the write data and the generated protection code sequence to the at least one memory device 191, 192. During subsequent read-write cycles or other memory accesses, the protection code sequence enables to verify whether or not the values of the stored write data are correct.

The data protection scheme to be applied may be preconfigured and/or dynamically configured at runtime by the mode controller 220. The mode controller 220 is provided to determine the data protection scheme to be applied out of a set of data protection schemes on the basis of context information available to the mode controller 220. The context information may be related to the system condition and/or the controller condition and/or the context information may be associated with and/or comprised in a received write transaction.

In an example of the present application illustrated in FIG. 2, the mode controller 220 is further configured to write the write data to the at least one memory device 191, 192 without applying a data protection scheme. The write data bypasses the data protection modules 240.1 to 240.*n* and is directly forwarded to the physical memory interface (PHY) 260 via which the write data is written to the at least one memory device 191, 192 without a protection code sequence. It should be noted that not generating protection code sequence may be understood as one of the data protection schemes, among which the mode controller 220 is enabled to select. Writing data without protection code sequence implies however, that during subsequent read-write cycles or other memory accesses, values of the stored write data cannot be verified for correctness. In particular, the unprotected write date is written to the at least one memory device 191, 192 in response to a data protection scheme with lowest level of data protection meaning that the write data are stored unprotected.

Figure 3A:
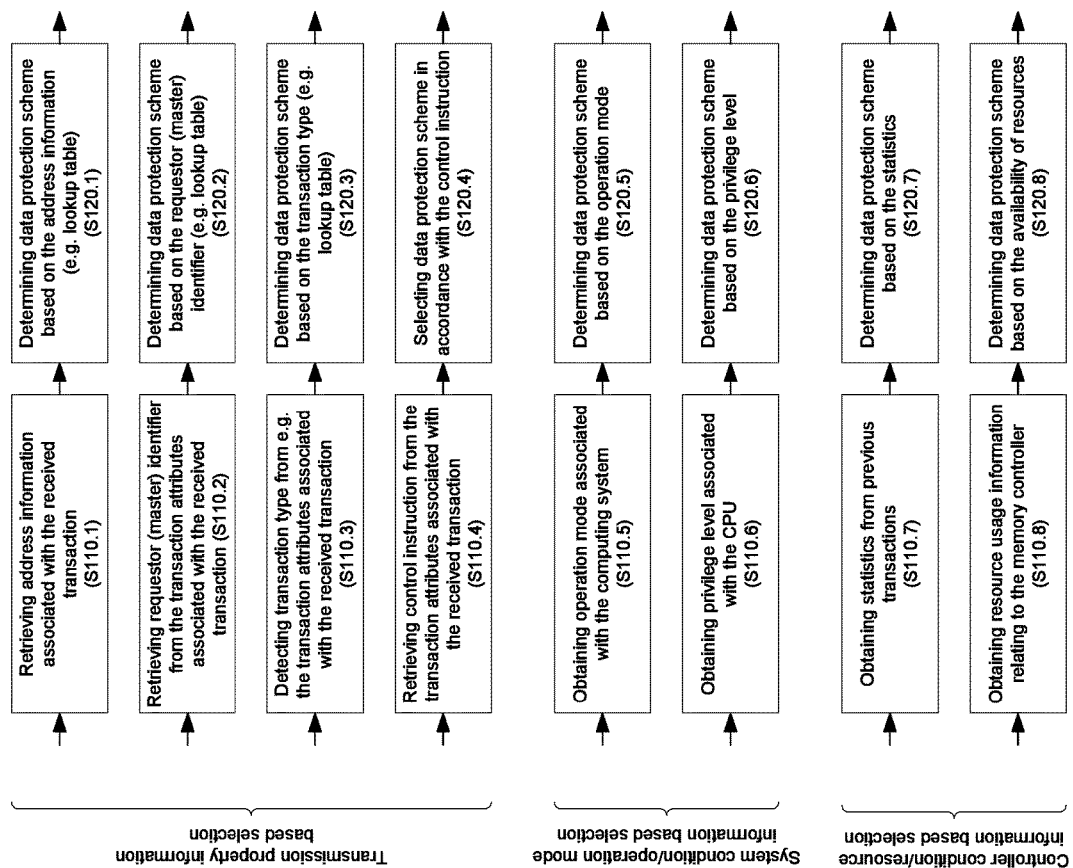
FIG. 3a schematically illustrates a flow diagram of a method to select a data protection scheme based on context information according to an example of the present invention.
Figure 3A:
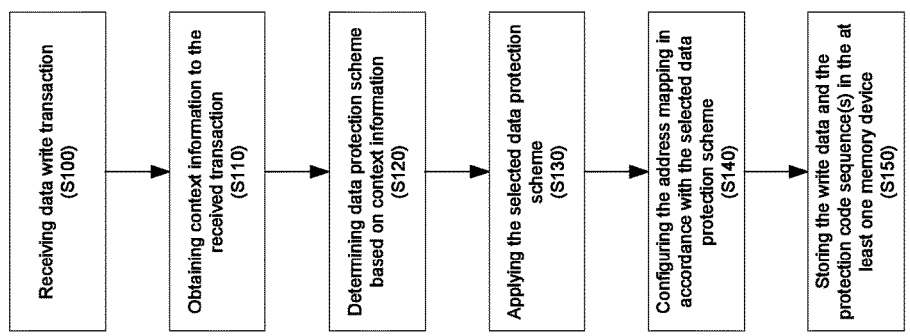

For the sake of further illustration, it is now referred to FIG. 3*a*, which shows a flow diagram schematically illustrating the operation of the mode controller 220 of the memory controller 200.

In operation S100, a write transaction is received by the memory controller 200. The write transaction comprises at least write data and an address information. The write data is to be written by the memory controller 200 at the at least one memory device 191, 192 coupled to the memory controller 200 through a physical memory interface (PHY) 260. The address information is supplied to an address mapping unit 250, which translates the received address information into a physical address of the at least one memory device 191, 192, at which the write data is written. The physical address is provided to the physical memory interface (PHY) 260 together with the write data.

Before passing the write data to the physical memory interface (PHY) 260, the write data is protected by one of the set of data protection schemes implemented in the memory controller 200. The data protection scheme to be applied is determined by the mode controller 220 in operations S110 and S120.

In operation S110, context information, on which the selection of the data protection scheme to be applied is based, is obtained and in operation S120, the data protection scheme is determined by selecting one out of the set of available data protection schemes based on the obtained context information or at least a part thereof.

In operation S130, the selected data protection scheme is applied on the data to be protected. The data to be protected comprises at least a part of the write data of the write transaction. However, the data to be protected is not limited to the write data but may comprises further data such as at least a part of the address information associated with the write transaction. The data to be written to the at least one memory device 191, 192 comprises the write data and the protection code sequence obtained by applying the selected data protection scheme.

In operation S140, the mode controller 220 may configure the address mapping unit 250 in accordance with the selected data protection scheme. The address mapping unit 250 is in particular configured to enable the storing and retrieving of the write data and the protection code sequence associated with each other in the at least one memory device 191, 192.

In an operation S150, the write data passed to the physical memory interface (PHY) 260 is stored into the at least one memory device 191, 192 at one or more physical addresses provided by the address mapping unit 250. Further, the one or more protection code sequences are passed to the physical memory interface (PHY) 260 is stored into the at least one memory device 191, 192 at one or more physical addresses provided by the address mapping unit 250.

It should be understood that the write data may be passed to the physical memory interface (PHY) 260 in form of one or more data partitions. The one or more data partitions may comprise a protection code sequence (e.g. a concatenated sequence formed of a write data partition and a protection code sequence). The write data and the one or more protection code sequences may be separately passed to the physical memory interface (PHY) 260 and stored in the at least one memory device 191, 192 in different cycles. The different cycles may be subsequent to each other or the one or more protection code sequences are cached and passed with a time delay to the physical memory interface (PHY) 260 to be stored in the at least one memory device 191, 192. The time delay may extend over several write transactions, in particular, the time delay may extend over a burst write transaction including a number of individual write transactions according to a burst length.

In the following, the context information based selection of a data protection scheme out of a plurality of data protection schemes will be further described. Those skilled in the art understand that the protection code sequence generated by a selected data protection scheme is specific thereto. Verifying values of stored write data for correctness on the basis of a generated protection code sequence requires knowledge about the applied data protection scheme.

In order to allow for verifying, information about the data protection scheme applied to write data stored in the at least one memory device 191, 192 may be retrieved from the address mapping unit 250, which translates the address information into a physical addresses of the at least one memory device 191, 192. The address mapping unit 250 may comprise one or more lookup tables, which associate address information and/or physical addresses with selected data protection scheme(s) applied for protecting the data written thereat.

In a further example, the data protection scheme to be applied may be determined using a functional relationship based on the context information including in particular address information associated with the write transaction. The address information may comprises address information of the write transaction and/or physical addresses associated with the address information of the write transaction.

The skilled person will further understand from the description of the present application that the mode controller 220 may be configured to determine a data protection scheme out of the plurality of data protection schemes in response to subsequent read-write cycles or other memory accesses. For instance, in response to a read transaction, the mode controller 220 is configured to determine that data protection scheme out of the plurality of data protection schemes, which has been selected for and applied to write data of an earlier write transaction. The mode controller 220 determines that earlier used data protection scheme based on context information relating to the read transaction. An example of the mode controller 220 configured to determine the data protection scheme based on context information relating to the read transaction is described below with reference to FIG. 3b.

The context information, on which the selection of the data protection scheme is based, may comprise transaction property information. The transaction property information includes for instance at least one of an address information, a requester or master identification, a control instruction, a type information, a burst length information, a tag information, and a status information. The requester identification, a type information, burst length information, tag information, and status information may be understood as transaction attributes conveyed to the memory controller 200 in conjunction with a write transaction. The transaction attributes of a write transaction may include one or several of the aforementioned exemplary transaction attributes depending on the implementation of the interconnect, to which the transaction interface 210 can be coupled.

In an example of the present application, the selection of the data protection scheme is based on the address information received in conjunction with the data transaction. The mode controller 220 may comprise a lookup table, which comprises associates address regions each associated with respective data protection scheme to be applied. In operation S110.1, the mode controller 220 is arranged to retrieve the address information for instance from the transaction interface 210 and to determine the data protection scheme depending on the retrieved address information, e.g. with the help of the lookup table by determining the matching address range and retrieving the respective data protection scheme associated therewith, in operation S120.1.

In an example of the present application, the selection of the data protection scheme is based on the requestor/master identifier received in conjunction with the data transaction issued by the requestor/master unit (e.g. a functional unit with bus mastering functionality coupled to the interconnect 180 of the computing system 100). The mode controller 220 may comprise a lookup table, which comprises requestor/master identifiers each associated with a respective data protection scheme to be applied. In operation S110.2, the mode controller 220 is arranged to retrieve the requestor/master identifier for instance from the transaction interface 210 and to determine the data protection scheme depending on the retrieved requestor/master identifier, e.g. with the help of the lookup table by determining the respective data protection scheme associated with the retrieved requestor/master identifier, in operation S120.2.

In an example of the present application, the selection of the data protection scheme is based on a type of the transaction. The type of the transaction may be determined e.g. from information relating to the transaction type, information identifying the transaction as a cacheable transaction, or may be deducted e.g. from a burst length information comprised in the transaction property information. The transaction property information is supplied to the mode controller 220 e.g. from the transaction interface 210. The mode controller 220 may comprise a lookup table, which associates transaction types with respective data protection schemes to be applied. In operation S110.3, the mode controller 220 is arranged to detect the transaction type e.g. on the basis of one or more transaction attributes received from the transaction interface 210 and to determine the data protection scheme dependent on the detected transaction type, e.g. with the help of the lookup table by retrieving the respective data protection scheme associated with the detected transaction type, in operation S120.3.

In an example of the present application, the selection of the data protection scheme is based on control information e.g. comprises in the transaction property information. The control information may be a dedicated mode control information instructing the mode controller 220 to select a respective data protection scheme to be applied. The control information may further comprise a mode identifier and a lookup table may comprise mode identifiers each associated with a respective data protection scheme to be applied. In an example of the present application, the selection of the data protection scheme is based on a protection level information, e.g. comprises by the transaction property information. The information about a protection level represents a control information relating to a mode identifier, which may be associated by a lookup table with the respective data protection scheme to be applied. In operation S110.4, the mode controller 220 is arranged to retrieve the control information e.g. from the transaction interface 210 and to select the data protection scheme in accordance with the retrieved control information, e.g. using a lookup table associating control information and data protection schemes, in operation S120.4.

The above examples are merely non-limiting and illustrative of a transmission property information based selection of a data protection scheme in accordance with the teaching of present application. The transaction property information is provided by the transaction interface 210 to the mode controller 220, which is configured to select one out of a plurality data protection schemes supported by the memory controller 200 on the basis of the retrieved transaction property information. Those skilled in the art will understand that the transmission property information may enable for defining further selection criteria. Moreover, those skilled in the art will understand that one or more of the above described selection criteria may be combined to a complex condition-based criteria scheme in a memory controller 200 according to an example of the present application.

In the following, further examples will be briefly described relating to non-limiting illustrative embodiments of the mode controller 220 in order to facilitate the understanding of the teaching of the present application with reference to the system condition/operation mode based selection.

The context information, on which the selection of the data protection scheme is based, may comprise at least one of information relating to the operation mode associated with the computing system 100 and information relating to the operation mode of memory controller 200.

The information relating to the operation mode associated with the computing system 100 may comprise e.g. normal operation mode, debug operation mode and/or fault failback (degraded) operation mode (in response to a fault detection) information.

In particular, the information relating to the operation mode associated with the computing system 100 may further comprise operation mode information associated with the processing unit (CPU) 110 of the computing system 100 such as information about CPU privilege level.

In an example of the present application, the selection of the data protection scheme is based on the operation mode associated with the computing system 100. The operation mode of the computing system 100 may be reported to or may be retrieved by the memory controller 200. The mode controller 220 may comprise a lookup table, which associates operation modes with respective data protection schemes to be applied. In operation S110.5, the mode controller 220 is arranged to obtain the operation mode of the computing system 100 and to determine the data protection scheme e.g. with the help of the lookup table by retrieving the respective data protection scheme associated with a current operation mode in operation S120.5.

In an example of the present application, the selection of the data protection scheme is based on the CPU privilege level of the processing unit (CPU) 110 of the computing system 100. In particular, the selection of the data protection scheme is based on the CPU privilege level used to execute software which issued the received data transaction. The information about the CPU privilege level may be comprises in the transaction attributes or may be obtained/detected on the basis of e.g. a software task identifier comprises in the transaction attributes. The mode controller 220 may comprise a lookup table, which associates CPU privilege levels with respective data protection schemes to be applied. In operation S110.6, the mode controller 220 is arranged to obtain the CPU privilege level and to determine the data protection scheme e.g. with the help of the lookup table by retrieving the respective data protection scheme associated with a current CPU privilege level in operation S120.6.

In the following, further examples will be briefly described relating to non-limiting illustrative embodiments of the mode controller 220 in order to facilitate the understanding of the teaching of the present application with reference to the controller conditions and resources based selection.

The memory controller 200 and in particular the mode controller 220 may acquire statistics information relating to access and/or performance statistics information. The memory controller 200 and in particular the mode controller 220 may comprise a monitoring unit, which is arranged to monitor the accesses to the memory controller 200 and generates statistics on accesses and/or performance based on the monitored accesses to the memory controller 200. On the basis of access statistics information, the data protection scheme to be applied is selected. The access statistic may comprise write, read, read-modify-write, access statistics and at the like. The performance statistics may comprise data throughput, latency statistics and the like. The statistics may comprise statistics with respect to one or more address regions, statistics relating to frequencies, statistics relating to the access sequences and the like. In operation S110.7, the mode controller 220 is arranged to obtain statistics information gathered from the monitoring of previous transactions the data protection scheme and to determine the data protection scheme based on at least a part of the statistics information in operation S120.7.

In an example, the mode controller 220 is arranged to determine the data protection scheme based on access statistics indicating that data is always block-wise written to address range (e.g. a DMA transfer of image data). In response to such an access statistics, the mode controller 220 selects a data protection scheme which individually covers for instance the data of a burst transaction of a given bust length, whereas otherwise the mode controller 220 may select a data protection scheme, which covers the data of a byte (8-bit data), a word (16/32/64-bit data) or double word (32/64/128-bit data). The data size individually covered by the data protection scheme is selected based on the access scheme detected from the access statistics obtained by the monitoring of the accesses to the memory controller 200.

In an example, the mode controller 220 is arranged to determine the data protection scheme based on performance statistics. The performance statistics in particular comprises net payload data throughput statistics. The net write data throughput is determined by the protection code sequences forming a data overhead to be transferred between memory controller 200 and the at least one volatile memory device 191, 192 having a data throughput defined by the interconnecting hardware physical hardware interface 260. The mode controller 220 may be configured to meet a predefined target net write data throughput.

The memory controller 200 and in particular the mode controller 220 may further select the data protection scheme to be applied based on the availability of resources internal to the memory controller 200. One or more data protection modules 240.*x* may make use of one or more cache memories for caching protection code sequences before writing to the least one volatile memory device 191, 192. Such cache memories may be dynamically assigned to open memory pages. In such a case, the mode controller 220 arranged to detect that resources currently occupied is configured to select a data protection scheme, which does not require the occupied resources of the memory controller 200. The mode controller 220 may be arranged to select a fallback data protection scheme. In operation S110.8, the mode controller 220 is arranged to obtain resource usage information relating to resources of the memory controller 200 and to determine the data protection scheme based on resources usage information in operation S120.8.

Starting from the above examples of the present application, the skilled person will immediately understand that mode controller 220 comprises decision logic for evaluating the context information and determining the data protection scheme to be applied to data received in a write transaction based on the result of a condition based evaluation. The skilled person will further immediately understand that the decision logic may be configured to evaluate a specified part of the context information or any combination of different parts of the context information including in particular transmission property information, system condition/operation mode information and controller condition/resource information. The decision logic, which controls the selection of the data protection scheme to be applied, may be based on a complex sequencing logic combining selection criteria relating to one or more specified parts of the context information such as exemplified above.

For instance, a decision logic may be combined the selectin operations S120 on the basis of a prioritizing scheme. The requestor/master identifier of the transmission property information of data transactions may be evaluated to select a respective data protection scheme based on the requestor/master identifier; e.g. image data received from a video camera may be handled differently from data received from the processing unit (CPU) 110 of the computing system 100. Further, the operation mode of the computing system 100 may be evaluated to select a respective data protection scheme in response to debug or fault failback (degraded) operation mode. The system operation mode based selection is for instance prioritized over the transmission property information based selection for determining the data protection scheme to be applied.

It is well understood that the aforementioned prioritizing is only one example to configure a decision logic based on combining different parts of the context information for determining the data protection scheme to be applied for data received in response to a write transaction. For instance, the type of a data transaction may only be evaluated and considered in case the write transaction is received from a DMA unit identified by the requestor/master identifier of the transmission property information.

The decision logic is preconfigured and/or configurable. A preconfigured decision logic may be understood as a decision logic, which is configured on the basis of firmware, which provides control, monitoring and data manipulation of the memory controller 200. A configurable decision logic may be understood as a decision logic, which is configurable at boot time and/or at runtime. In particular, the decision logic may be configurable by an application executed on the computing system. The application may be executed at an elevated privilege level.

The decision logic may be configurable with regards to the specific context information to be evaluated for selecting a data protection scheme. The decision logic may comprise one or more conditions parametrized one the basis of one or more configurable parameters e.g. maintained in one or more registers, for evaluating the context information. In particular, the lookup tables described in the aforementioned examples may be understood as configurable parameters, which may be preconfigured and/or configurable. A preconfigured lookup table may be configured on the basis of firmware. A configurable lookup table may be configurable at boot time and/or at runtime using e.g. an application executed on the computing system.

Figure 3B:
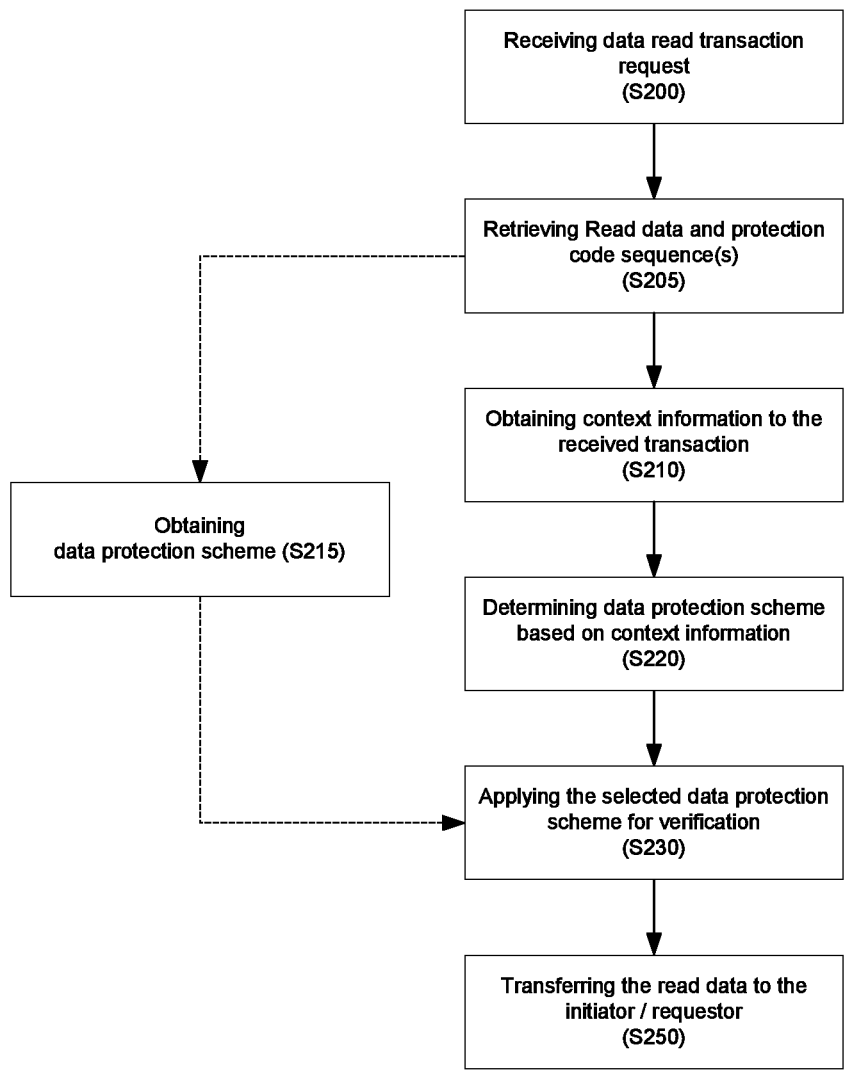
FIG. 3b schematically illustrates a flow diagram of a method to select a data protection scheme based on context information according to an example of the present invention.

For the sake of further illustration, it is now referred to FIG. 3b, which shows a further flow diagram schematically illustrating the operation of the mode controller 220 of the memory controller 200.

In operation S200, a request for a read transaction is received by the memory controller 200 from an initiator/requestor. The read transaction request comprises an address information. The read data is stored in the at least one memory device 191, 192 coupled to the memory controller 200 through a physical memory interface (PHY) 260. The address information is supplied to an address mapping unit 250, which translates the received address information into a physical address of the at least one memory device 191, 192, at which the read data is stored. The physical address is provided to the physical memory interface (PHY) 260.

In an operations S205, the read data stored in the at least one memory device 191, 192 is retrieved. Further in order to allow for verifying the values of the stored read data, the one or more protection code sequences associated with the stored read data are retrieved. The one or more protection code sequences associated with the stored read data may be retrieved from the at least one memory device 191, 192. The address mapping unit 250 may comprise mapping information indicative of the storage position of the one or more associated protection code sequences. The one or more protection code sequences associated with the stored read data may be likewise retrieved from a cache or buffer memory in the memory controller 200.

The data protection scheme on the basis of which the associated protection code sequence(s) has/have been generated, is to be determined to enable the value verification. The previously applied data protection scheme is determined by the mode controller 220 in operations S210 and S220 or S215. The operations S210 and S220 may be considered to mirror the operations S110 and S120 described above with reference to FIG. 3a.

In operation S210, context information to the read transaction request is obtained and, in an operation S220, one data protection scheme is selected out of the set of available data protection schemes based on the obtained context information or at least a part thereof. The various aforementioned examples to determine and select a data protection scheme out of the set of available data protection schemes apply likewise.

Please note that the operations S205 and S210 may be performed in any order, overlapping in time or substantially simultaneously.

In operation S215, the data protection scheme to be applied for verification is retrieved from a table comprising associations between (physical) address information and data protection scheme used for data stored at the corresponding (physical) address(es). The table may be part of the address translation table used by the address mapping unit 250.

In operation S230, the selected or retrieved data protection scheme is applied to verify the correctness of the values of the read data retrieved from the at least one memory device 191, 192 with the help of the one or more protection code sequences using the selected data protection scheme.

In an operation S250, the read data is compiled into a read transaction and passed to the transaction interface 210 to be transferred to the initiator/requestor of the read data transaction request.

Figure 4:
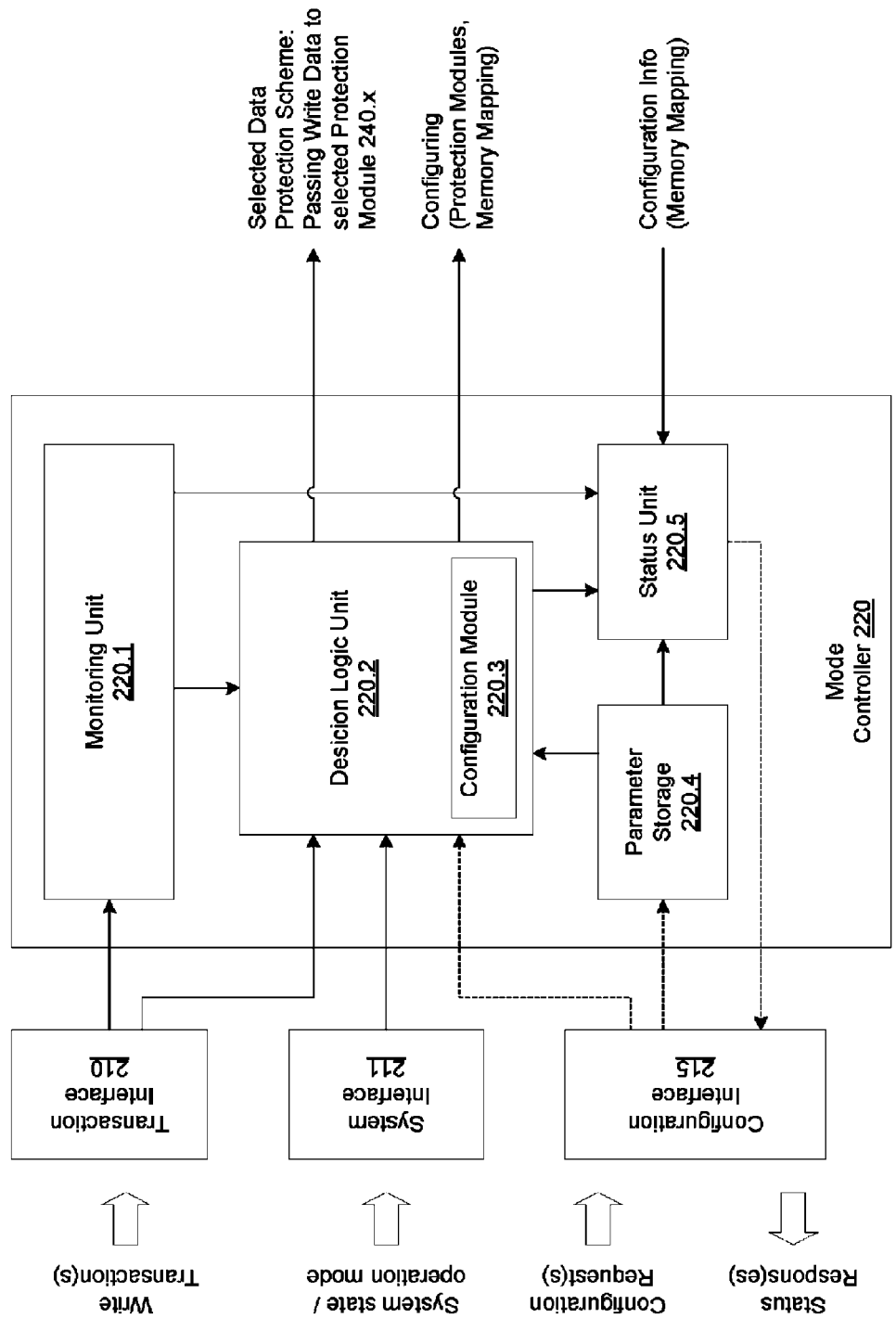
FIG. 4 schematically illustrates a block diagram of a mode controller for selecting a data protection scheme based on context information according to an example of the present invention.

Referring now to FIG. 4, a schematic block diagram of an example of a mode controller 220 in accordance with the present application is illustrated. The mode controller 220 comprises decision logic unit 220.2, a configuration module 220.3 and a parameter/table storage 220.4.

The decision logic unit 220.2 is coupled to at least one interface for receiving or for being supplied with context information. The decision logic unit 220.2 is for instance coupled to the transaction interface 210 of the memory controller 200 to receive transaction property information such as an address information, a requestor/master identifier and the like conveyed via the interconnect of the computing system 100 to the transaction interface 210 in the conjunction with a write transaction. The decision logic unit 220.2 is further exemplarily coupled to system interface 211, via which the operation mode of the computing system 100 is supplied to the mode controller 220 or via which the mode controller 220 can retrieve the operation mode of the computing system 100.

The decision logic unit 220.2 may be also coupled to a configuration interface 215, through which the decision logic unit 220.2 is configurable. Configuration messages for instance generated by an application executed on the processing unit (CPU) 110 of the computing system 100 may be transmitted to the configuration interface 215 to configure the one or more context information to be evaluated by the decision logic of the decision logic unit 220.2 to select a respective data protection scheme based on the condition based decision result.

The parameter/table storage 220.4 is provided to maintain configuration data used by the decision logic for determining a data protection scheme. The configuration data comprise parameters and/or parameter tables applied by the decision logic for determining a selected data protection scheme based on the context information as illustratively described above. The parameter/table storage 220.4 may be coupled to the configuration interface 215 for receiving control requests relating to configuration parameters. In particular, the configuration data comprises parameters and/or tables.

In an example of the present application, the configurable decision logic unit 220.2 is implemented on the basis of a programmable microcontroller, which allows to define one or more selection criteria for selecting a data protection scheme out of a plurality of available data protection schemes based on the context information and the parameters and/or tables maintained in the parameter/table storage 220.4. In response to a selected data protection scheme, the configurable decision logic unit 220.2 may generate a control signal, in response to which the data of the received transaction is passed in the memory controller 200 to the respective data protection module 240.*x* for generating the protection code sequence and further to the physical memory interface (PHY) 260 for being stored in the at least one volatile memory device 191, 192.

As already described above, different data protection schemes may be assigned to distinct memory regions, which enables to use data protection scheme of different scope and strength for the distinct memory regions or to optimize the net data throughput with respect to typical data access schemes to the distinct memory regions.

The data protection module 240.*x* may be configurable to apply e.g. data protection schemes of different levels, granularities, scopes and/or write strategies using resources such as caches. In an example of the present application, the mode controller 220 further comprises a configuration module 220.3, which may be part of the decision logic unit 220.2, to configure one or more data protection modules 240.*x*. For instance, a data protection module 240.*x* may be configured by the configuration module 220.3 to apply a data protection scheme of a first protection level on data received in a first write transaction and to apply a data protection scheme of a second protection level on data received in a later write transaction. The data protection scheme of a first protection level may comprise the generation of a protection code sequence allowing to detect a single bit error (SED). The data protection scheme of a second protection level may comprise the generation of a protection code sequence allowing to detect a double bit error and to correct a single bit error (DED-SEC). Herein, the protection level relates to the number of detectable erroneous bits and/or the number of correctible erroneous bits.

For instance, a data protection module 240.*x* may be configured by the configuration module 220.3 to make use of one or more caches for write transactions addressing one or more defined memory regions and/or originating from one or more defined functional units with bus mastering functionality. The one or more caches may be assigned statically and/or dynamically to one or more defined memory regions and/or one or more defined functional units with bus mastering functionality. The one or more caches may be used for write and/or read transactions. A data protection module 240.*x* may be configured by the configuration module 220.3 to make use of the caches or not to make use of the caches in accordance with the defined cache use criteria.

In an example, the mode controller 220 further comprises a monitoring unit 220.1, which is provided to monitor the data transactions addressing the memory controller 200. The monitoring unit 220.1 implements a monitoring logic, which is configured to monitor the accesses addressing the memory controller 200 and performance related data based on data passing through the memory controller 200, and a statistics logic, which is configured to obtain access and/or performance statistics based on the data gathered by the monitoring logic. The access and/or performance statistics is for instance provided to the decision logic unit 220.2, which is configurable to select a data protection scheme based on the supplied access and/or performance statistics.

In an example, the mode controller 220 further comprises a status unit 220.5, which is arranged to provide status information relating to the operation of the memory controller 200 to e.g. an application executed on the processing unit (CPU) 110 of the computing system 100. The application may be executed with a privileged level and upon a status request e.g. transmitted via the configuration interface 215, the status unit 220.5 is configured to generate a status information response comprising for instance access and/or performance statistics information, a current physical memory map, e.g. retrieved from the address mapping unit 250, and/or state information relating to the operation state of the memory controller 200. The operation state may in particular comprise the operation state of the mode controller 220 and/or configuration information relating to the decision logic unit 220.2. The state information may comprise information about illegal accesses and/or information about conflicting configuration.

Figure 5:
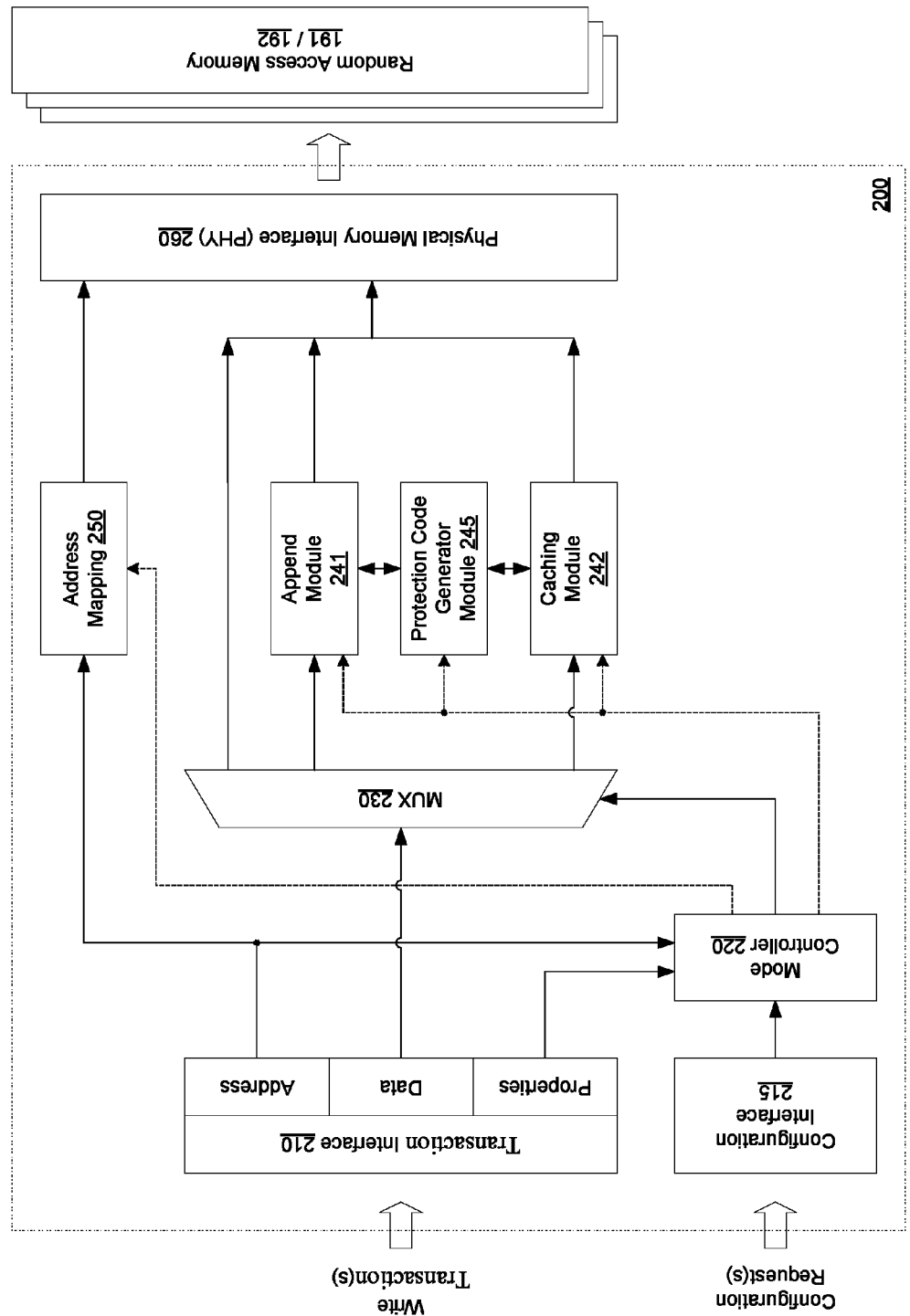
FIG. 5 schematically illustrates a block diagram of a memory controller supporting two data protection schemes according to an example of the present invention.

Referring now to FIG. 5, a block diagram of an exemplary memory controller 200 in accordance with the present application is schematically illustrated. The exemplary memory controller 200 of FIG. 5 comprises two data protection modules 241 and 242 and a protection code generator module 245. The two data protection modules 241 and 242 support at least two different data protection scheme.

The first data protection module 241 is an appending module 241 arranged to generate a protection code sequence for each byte (8-bit sequence) of data received in a write data transaction. A generated protection code sequence is appended to each byte and the resulting bit sequence is supplied to the physical memory interface 260 for being written into the at least one volatile memory 191, 192.

The second data protection module 242 is a caching module 242 arranged to cache several protection code sequences generated by the protection code generator module 245 to protect data of several write transactions received by the memory controller 200. The data of the received write transactions is passed via the physical memory interface (PHY) 260 to the at least one volatile memory 191, 192 and stored therein. The cached protection code sequences are time-delayed passed to the physical memory interface (PHY) 260 to the at least one volatile memory 191, 192 and stored therein. The storing of the cached protection code sequences is deferred e.g. to increase the net data throughput of the memory controller 200.

The data protection modules 241 and 242 make use of the common protection code generator module 245 to generate protection code sequences.

The mode controller 220 is arranged to selectively pass the data of a received write transaction to one of the data protection modules 241 and 242 or to directly route the data of a received write transaction to the physical memory interface (PHY) 260 such that the data is stored in the at least one volatile memory 191, 192 without data protection.

The mode controller 220 is further arranged to configure the address mapping unit 250 in accordance with the selected data protection scheme.

In an example of the present application, the protection code generator module 245 is configurable by the mode controller 220 to generate protection code sequences of different strengths. The appending module 241 may be applicable in conjunction with the configurable protection code generator module 245 to perform different data protection schemes each differing in the strength of protection.

Figure 6:
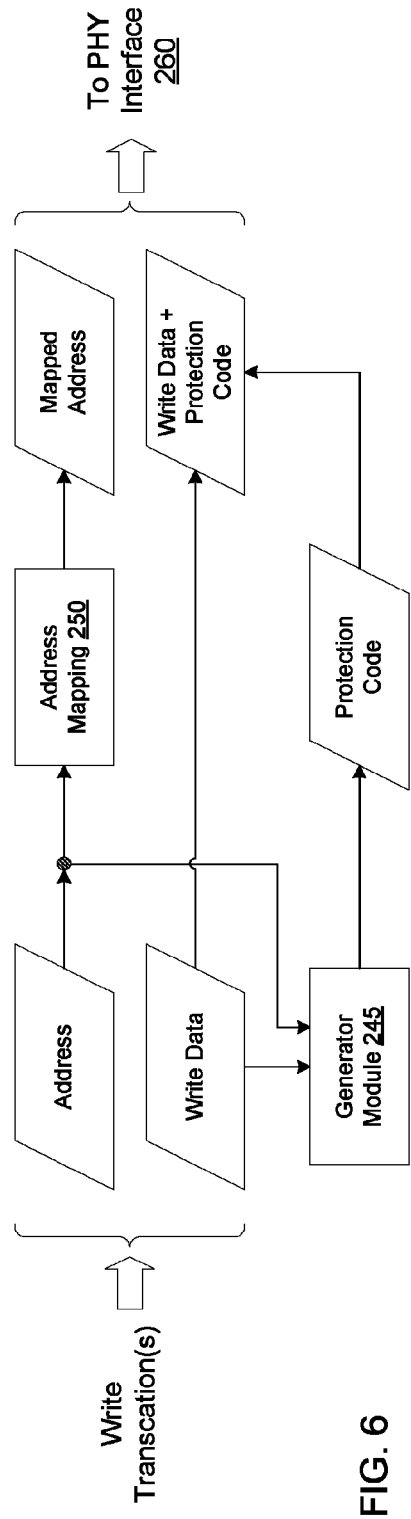
FIG. 6 schematically illustrates a block diagram of a data protection module with protection code append functionality according to an example of the present invention.

Referring now to FIG. 6, a block diagram of an exemplary appending module 241 in accordance with the present application is schematically illustrated. The appending module 241 is arranged to generate a protection code sequence for each byte (8-bit sequence) of data received in a write data transaction. The protection code sequence is generated by the protection code generator module 245 and appended to each byte. The resulting bit sequence is passed to the physical memory interface (PHY) 260.

The appending module 241 may be configurable to generate a protection code sequence and to append the generated protection code sequence to each $2^N$-bit sequence such as each byte (8-bit sequence), each word (16-bit or 32-bit sequence), or each double word (32-bit or 64-bit sequence) of data received in a write data transaction.

Further, the appending module 241 may be configurable to generate protection code sequence on the basis of each $2^N$-bit sequence and the address information associated with a received write transaction. The protection code sequence is generated on the basis of each bit sequence formed of a $2^N$-bit sequence of the received write data and the associated address information. The scope of the protection code sequence covers additionally the address information associated with the received write transaction.

The appending module 241 implements in particular an apparatus for transfer of data elements between a CPU and a DRAM controller as described in US 2015 030 1890 A1, which is incorporated by reference herewith. An appending module 241 according to US 2015 030 1890 A1 may be configured to support triple error detection and double error correction (TED-DEC) and further covers the address information associated with a write transaction.

Figure 7:
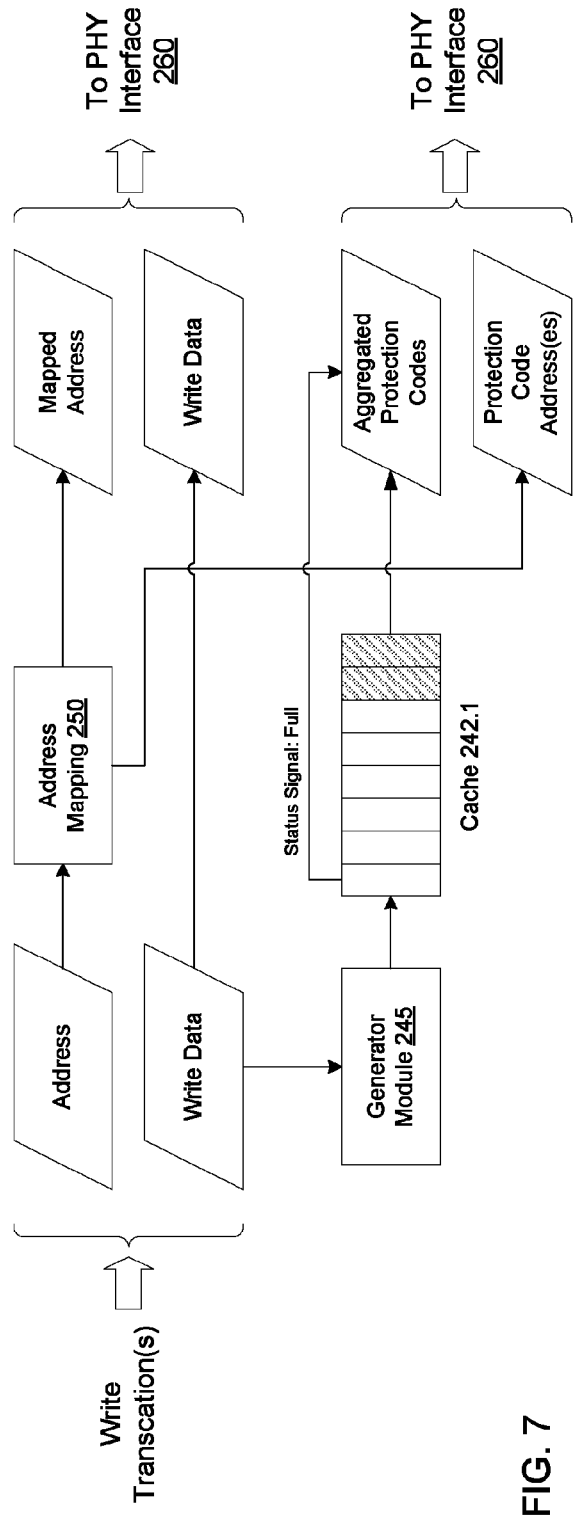
FIG. 7 schematically illustrates a block diagram of a data protection module with cache functionality according to an example of the present invention.

Referring now to FIG. 7, a block diagram of an exemplary caching module 242 in accordance with the present application is schematically illustrated. The caching module 242 comprises a cache 242.1 arranged to cache several protection codes sequence. A protection codes sequence is for instance generated from data of a write transaction. The storing of the cached protection codes sequences in the at least one volatile memory 191, 192 is deferred. In one example, in response to a status signal indicative of a full cache, the cached protection codes sequences are aggregated and passed to the physical memory interface (PHY) 260 to be stored in the at least one volatile memory 191, 192.

The data protection scheme performed by the caching module 242 may be used for burst transactions comprising a predefined number of subsequent write transactions. The data of the subsequent write transactions is immediately passed to the physical memory interface (PHY) 260 to be stored in the at least one volatile memory 191, 192, whereas at least one protection codes sequence is generated for the data of each write transaction and cached in the cache 242.1.

For instance, a burst transaction comprises 8 individual write transactions (the burst length is 8) and each write transaction comprises write data formed of a 64-bit sequence. The desired protection level should allow for single error correction-double error detection (SEC-DED).

The length of the protection code sequence depends on the length of the write data as shown in the following table

| Number of data bits | Number of bits of SEC-DED protection code |
|---|---|
| 16-31 | 6 |
| 32-63 | 7 |
| 64-127 | 8 |
| 128-255 | 9 |

For each write transaction of the burst transaction, an 8-bit SEC-DED protection code sequence is cached. In total, the cache comprises 64 bits formed of 8 8-bit SEC-DED protection code sequence. The content of the cache is passed as a $9^{th}$ 64-bit sequence to the physical memory interface (PHY) 260 to be written in the at least one memory device 191, 192. The bandwidth overhead due to the protection code sequences is 12.5% in case the write transactions are burst aligned.

In an example of the present application, the caching module 242 is further arranged to perform a masked writing of the cached protection code sequences in case the caching module 242 detects that less than the total number of write transactions of a burst transactions are received, e.g. only 7 or less write transactions of a total burst length of eight are received and as a consequence thereof, the incomplete number of cached protection code sequences have to be written, i.e. the number of bits of the cached protection code sequences is less than the width of the physical memory interface (PHY) 260.

In an example of the present application, the caching module 242 is further arranged to support read-modify-write operations to enable access to bit sequences with a length less than the width of the physical memory interface (PHY) 260. For instance, the width of the physical memory interface (PHY) 260 is 64 bits. The support read-modify-write operations enables access to stored sequences less than 64 bit long such as to an 8-bit byte or a 16/32 bit word.

According to an example of the present application, a memory controller is provided, which comprises a transaction interface 210, a mode controller 220, at least one data protection module 240.x, and a physical memory interface (PHY) 260.

The transaction interface 210 is provided to be coupled to a transaction interconnect of a computing system. The transaction interface 210 interfaces data transactions, i.e. read data transactions originating from the memory controller and write data transactions terminating at the memory controller, and is configured to receive a write transaction. The write transaction comprising a predefined payload of write data.

The mode controller 220 is coupled to the transaction interface 210 and arranged to obtain context information. The obtained context information is related to the received write transaction, e.g. is available from the write transaction or is in temporal relationship with the write transaction. The mode controller 220 is arranged to select a data protection scheme out of a plurality of at least two distinct data protection schemes based on the obtained context information.

The at least one data protection module 240.x is coupled to the transaction interface 210 for receiving the write data. The plurality of the at least two distinct data protection schemes are supported by the at least one data protection module 240.x. Each one of the at least one data protection module 240.x is provided to support at least one data protection scheme. The at least one data protection module 240.*x* is configured to apply the selected data protection scheme by generating one or more protection code sequences from at least the write data in accordance with the selected data protection scheme. In an example of the present application, the memory controller 200 comprises at least two data protection modules 240.*x*, each of which is configured to support one of the at least two data protection schemes.

The physical memory interface 260 is coupled to the at least one data protection module 240.*x* and arranged to be coupled to at least one memory device 191, 192. The physical memory interface interfaces data communication between the memory controller and the at least one memory device 191, 192.

The write data and the one or more protection code sequences is to be stored by the physical memory interface 260 in the at least one memory device. The one or more protection code sequences enable to detect one or more bit errors and/or to correct one or more bit errors.

According to an example of the present application, the memory controller further comprises a plurality of data protection modules, each of which is capable of applying at least one data protection scheme out of a plurality of distinct data protection schemes.

According to an example of the present application, each of the distinct data protection schemes is defined by at least one of a protection level, a protection granularity, protection scope, a different protection code write strategy and any combination thereof.

According to an example of the present application, the context information comprises at least one of transaction property information, system condition and/or operation mode information and memory controller condition and/or resource usage information.

According to an example of the present application, the transaction property information comprises at least one of address information associated with the write transaction and transaction attributes.

According to an example of the present application, the system condition and/or operation mode information comprises at least one of information relating to the operation mode of the computing system and an information relating to a privilege level of a processing unit of the computing system.

According to an example of the present application, the memory controller condition and/or resource usage information comprises at least one of information relating to access statistic and/or performance statistics and resource usage of the memory controller.

According to an example of the present application, the memory controller 200 further comprises a decision logic unit 220.2, which is arranged to receive the context information, to evaluate at least a part of the context information with respect to one or more condition-based selection criteria and to select the data protection scheme to be applied based on the evaluation result.

According to an example of the present application, the memory controller 200 further comprises a parameter storage coupled to the decision logic for storing at least one of parameters and lookup tables relating to the condition-based selection criteria.

According to an example of the present application, the memory controller 200 further comprises a monitoring unit configured to monitor at least one of transactions handled by the memory controller and data flow through the memory controller and to generate access and/or performance statistics on the basis of the monitored transactions and data flow.

According to an example of the present application, the memory controller 200 further comprises a status unit configured to generate status information relating to the operation of the mode controller.

According to an example of the present application, the at least one data protection module 240.*x* of the memory controller 200 comprises a caching module and an appending module. The caching module has a cache for temporarily caching a predefined number of protection code sequences to allow for deferred writing of the cached protection code sequences to the at least one memory device. The appending module is configured to partition the write data of the write transaction and to append a protection code sequence to each partition of the write data.

According to an example of the present application, a method of operation a memory controller 200 is provided, which comprises receiving a write transaction via a transaction interface 210 arranged to be coupled to a transaction interconnect 180 of a computing system 100; obtaining context information relating to the received write transaction by a mode controller 220 coupled to the transaction interface and selecting a data protection scheme out of a plurality of distinct data protection schemes based on the obtained context information by the mode controller 220; applying the selected data protection scheme by generating one or more protection code sequences from at least the write data in accordance with the selected data protection scheme by at least one data protection module 240.*x* coupled to the transaction interface 210 for receiving the write data; and providing the write data and the one or more protection code sequences to a physical memory interface 260 coupled to the at least one data protection module 240.*x* and arranged to be coupled to at least one memory device 191, 192 to store the write data and the one or more protection code sequences in the at least one memory device 191, 192. The one or more protection code sequences enable to detect one or more bit errors and/or to correct one or more bit errors.

The memory controller 200 is a memory controller according to one of the examples described above.

According to an example of the present application, the method further comprises caching the one or more protection code sequences before being provided to the physical memory interface 260 in a cache 242.1 arranged to cache protection code sequences of several write transaction; and providing the cached protection code sequences to the physical memory interface 260 in case the cache is full or in case all protection code sequences relating to a burst write transaction comprising a number of subsequent write transactions are cached.

According to an example of the present application, on receiving a read transaction request via the transaction interface, read data are retrieved from the at least one data memory device via the physical memory interface in accordance with the read transaction request; the one or more protection code sequences associated with the read data are retrieved; one data protection scheme out of a plurality of distinct data protection schemes is selected; and the value(s) of the read data is/are verified based on the selected data protection scheme and the one or more retrieved protection code sequences. The data protection scheme selected for verification of the read data corresponds to the data protection scheme applied previously during writing of the data to the at least one memory device.

According to an example of the present application, the selecting of one data protection scheme out of a plurality of distinct data protection schemes further comprises obtaining context information relating to the received read transaction request by the mode controller, and selecting the data protection scheme out of the plurality of distinct data protection schemes based on the obtained context information by the mode controller.

According to an example of the present application, a non-transitory, tangible computer readable storage medium is provided, which bears computer executable instructions for operating a memory controller. The instructions, when executing on one or more processing devices, cause the one or more processing devices to perform a method comprising: receiving a write transaction via a transaction interface arranged to be coupled to a transaction interconnect of a computing system; obtaining context information relating to the received write transaction by a mode controller coupled to the transaction interface and selecting a data protection scheme out of a plurality of distinct data protection schemes based on the obtained context information by the mode controller; applying the selected data protection scheme by generating one or more protection code sequences from at least the write data in accordance with the selected data protection scheme by at least one data protection module coupled to the transaction interface for receiving the write data; and providing the write data and the one or more protection code sequences to a physical memory interface coupled to the at least one data protection module and arranged to be coupled to at least one memory device to store the write data and the one or more protection code sequences in the at least one memory device. The one or more protection code sequences enable to detect one or more bit errors and/or to correct one or more bit errors.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of both. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Some of the above embodiments, as applicable, may be implemented using a variety of different circuitry components. For example, the exemplary topology in the figures and the discussion thereof is presented merely to provide a useful reference in discussing various aspects of the invention. Of course, the description of the topology has been simplified for purposes of discussion, and it is just one of many different types of appropriate topologies that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements. For example, the protection modules 240.*x* of FIG. 2 may be integrated with each other or with further logical components such as the mode controller 220 in the memory controller 200. Moreover, the interfaces including the transaction interface 210, the configuration interface 215 and/or the system interface 211 may be implemented in one common interface interfacing with an interconnect of the computing system 100.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

In the claims, any reference signs placed between parentheses shall not be construed as limiting the claim. The word "comprising" does not exclude the presence of other elements or operations then those listed in a claim. Furthermore, the terms "a" or "an", as used herein, are defined as one or as more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an". The same holds true for the use of definite articles. Unless stated otherwise, terms such as "first" and "second" are used to distinguish arbitrarily between the elements such terms describe. Thus, these terms are not necessarily intended to indicate temporal or other prioritization of such elements. The mere fact that certain measures are recited in mutually different claims does not indicate that a combination of these measures cannot be used to advantage.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A memory controller, said memory controller, comprising:
 a transaction interface arranged to be coupled to a transaction interconnect of a computing system and configured to receive a write transaction comprising write data;
 a mode controller coupled to the transaction interface and arranged to obtain context information relating to the received write transaction and to select a data protection scheme out of a plurality of at least two distinct data protection schemes based on the context information, wherein the context information includes a requestor identification of a requestor of the write transaction;
 at least one data protection module coupled to the transaction interface for receiving the write data and configured to apply the selected data protection scheme by generating one or more protection code sequences from at least the write data in accordance with the selected data protection scheme; and
 a physical memory interface coupled to the at least one data protection module and arranged to be coupled to at least one memory device to store the write data and the one or more protection code sequences in the at least one memory device, wherein the one or more protection code sequences correct one or more bit errors.

2. The memory controller according to claim 1, further comprising:
 a plurality of data protection modules, each of which is capable of applying at least one data protection scheme out of the plurality of the at least two distinct data protection schemes.

3. The memory controller according to claim 1, wherein each of the at least two distinct data protection schemes is defined by at least one of a protection level, a protection granularity, protection scope, a different protection code write strategy and any combination thereof.

4. The memory controller according to claim 1, further comprising:
 a decision logic unit arranged to receive the context information, to evaluate at least a part of the context information with respect to one or more condition-based selection criteria and to select the data protection scheme to be applied based on the evaluation.

5. The memory controller according to claim 4, further comprising:
 a parameter storage coupled to the decision logic for storing configuration data relating to the condition-based selection criteria.

6. The memory controller according to claim 1, further comprising:
 a monitoring unit configured to monitor at least one of transactions handled by the memory controller and data flow through the memory controller and to generate performance statistics on the basis of the monitored transactions and the data flow.

7. The apparatus according to claim 1, further comprising:
 a status unit configured to generate status information relating to the operation of the mode controller.

8. The memory controller according to claim 1, wherein the at least one data protection module comprises:
 a caching module having a cache for temporarily caching a predefined number of protection code sequences to allow for deferred writing of the cached protection code sequences to the at least one memory device; and
 an appending module configured to partition the write data of the received write transaction and to append a protection code sequence to each partition of the write data.

9. A method of operating a memory controller, said method comprising:
 receiving a write transaction via a transaction interface arranged to be coupled to a transaction interconnect of a computing system;
 obtaining context information relating to the received write transaction by a mode controller coupled to the transaction interface, wherein the context information includes a requestor identification of a requestor of the write transaction;

selecting a data protection scheme out of a plurality of at least two distinct data protection schemes based on the context information by the mode controller;

applying the selected data protection scheme by generating one or more protection code sequences from at least the write data in accordance with the selected data protection scheme by at least one data protection module coupled to the transaction interface for receiving the write data; and providing the write data and the one or more protection code sequences to a physical memory interface coupled to the at least one data protection module and arranged to be coupled to at least one memory device to store the write data and the one or more protection code sequences in the at least one memory device, wherein the one or more protection code sequences correct one or more bit errors.

10. The method according to claim 9, further comprising caching the one or more protection code sequences before being provided to the physical memory interface in a cache arranged to cache protection code sequences of several write transaction; and providing the cached protection code sequences to the physical memory interface in response to at least one of detecting that the cache is full, detecting that all protection code sequences relating to a burst write transaction comprising a number of subsequent write transactions are cached, detecting that a predefined period of time is elapsed, and a cache maintenance operation is initiated.

11. The method according to claim 9, wherein the memory controller is a memory controller according to claim 1.

12. The method according to claim 9, further comprising:
receiving a read transaction request via the transaction interface;
retrieving read data from the at least one data memory device via the physical memory interface in accordance with the read transaction request;
retrieving the one or more protection code sequences associated with the read data;
selecting a data protection scheme out of the plurality of the at least two distinct data protection schemes;
verifying the read data based on the selected data protection scheme and the one or more retrieved protection code sequences.

13. The method according to claim 12, wherein the selecting of the data protection scheme:

obtaining the context information relating to the received read transaction request by the mode controller, and
selecting the data protection scheme out of the plurality of distinct data protection schemes based on the context information by the mode controller.

14. A non-transitory, tangible computer readable storage medium bearing computer executable instructions for operating a memory controller, wherein the instructions, when executing on one or more processing devices, cause the one or more processing devices to perform a method comprising:
receiving a write transaction via a transaction interface arranged to be coupled to a transaction interconnect of a computing system;
obtaining context information relating to the received write transaction by a mode controller coupled to the transaction interface, wherein the context information includes a requestor identification of a requestor of the write transaction;
selecting a data protection scheme out of a plurality of at least two distinct data protection schemes based on the context information by the mode controller;
applying the selected data protection scheme by generating one or more protection code sequences from at least the write data in accordance with the selected data protection scheme by at least one data protection module coupled to the transaction interface for receiving the write data; and
providing the write data and the one or more protection code sequences to a physical memory interface coupled to the at least one data protection module and arranged to be coupled to at least one memory device to store the write data and the one or more protection code sequences in the at least one memory device, wherein the one or more protection code sequences correct one or more bit errors.

15. The memory controller according to claim 1, wherein the data protection scheme is selected based on the requestor identification and a previously selected data protection scheme.

16. The method according to claim 9, wherein the data protection scheme is selected based on the requestor identification and a previously selected data protection scheme.

17. The non-transitory, tangible computer readable storage medium bearing computer executable instructions according to claim 14, wherein the data protection scheme is selected based on the requestor identification and a previously selected data protection scheme.

* * * * *